United States Patent [19]

Christiansen et al.

[11] Patent Number: 4,710,343

[45] Date of Patent: Dec. 1, 1987

[54] NUCLEAR BREEDER REACTOR FUEL ELEMENT WITH SILICON CARBIDE GETTER

[75] Inventors: David W. Christiansen, Kennewick; Richard A. Karnesky, Richland, both of Wash.

[73] Assignee: The United States of America as represented by the United States Department of Energy, Washington, D.C.

[21] Appl. No.: 802,559

[22] Filed: Nov. 27, 1985

[51] Int. Cl.⁴ .............................................. G21C 3/20
[52] U.S. Cl. .................................. 376/414; 376/417; 376/418
[58] Field of Search ................ 376/418, 414, 417, 420

[56] References Cited

U.S. PATENT DOCUMENTS

| | | | |
|---|---|---|---|
| 3,276,968 | 10/1966 | Ingleby | 376/418 X |
| 3,291,700 | 12/1966 | Brossa et al. | 376/417 X |
| 3,352,757 | 11/1967 | Dee et al. | 376/418 X |
| 3,620,835 | 11/1971 | Drittler et al. | 376/417 X |
| 3,772,147 | 11/1973 | Bratton et al. | 376/418 X |
| 4,124,659 | 11/1978 | della Porta et al. | 376/418 X |
| 4,257,847 | 3/1981 | Gibby et al. | 376/418 X |

Primary Examiner—John F. Terapane
Assistant Examiner—John S. Maples
Attorney, Agent, or Firm—Robert Southworth, III; Judson R. Hightower

[57] ABSTRACT

An improved cesium getter 28 is provided in a breeder reactor fuel element or pin in the form of an extended surface area, low density element formed in one embodiment as a helically wound foil 30 located with silicon carbide, and located at the upper end of the fertile material upper blanket 20.

2 Claims, 8 Drawing Figures

NUCLEAR BREEDER REACTOR FUEL ELEMENT WITH SILICON CARBIDE GETTER

GOVERNMENT CONTRACT

The Government has rights in this invention pursuant to Contract No. DE-AC06-76FF02170 awarded by the U.S. Department of Energy.

This invention pertains to the art of breeder reactor fuel elements incorporating fission product getters.

BACKGROUND OF THE INVENTION

Fast reactors, and fast breeder reactors in particular, generally consist of a central core of fissile material surrounded by a fertile material blanket. In one design, the core is composed of a number of subassemblies each containing a multiplicity of fuel pins or elements. Each fuel pin is a closed cylinder and contains a column of fuel material, typically mixed uranium and plutonium oxide, with columns of fertile material, typically uranium oxide, located above and below the fuel column to form axial blankets. Fission products produced as a result of the fission of fissile and fertile materials are retained in the fuel pin during reactor operation.

Cesium is one of the most abundant of the fission products produced during the fission process. With a low melting temperature and a high vapor pressure at typical oxide fuel operating temperatures in liquid metal fast breeder reactors, cesium readily relocates both radially and axially within a fuel pin. As a result of the cesium migration, cesium will tend to accumulate in highly localized areas in the fuel pin. These localized cesium accumulations are often associated with localized cladding strain, fuel deformation, and fragmentation of fuel and blanket pellets. In some cases, localized cesium concentration is believed to have been responsible for premature cladding failure.

PRIOR ART EFFORTS

Previous attempts at controlling the effects of cesium migration have been divided into two categories. The first comprises changes in fuel and/or blanket specifications. Correlations describing the cesium migration phenomena show that the amount of cesium that will migrate in a mixed-oxide fuel column may be reduced by increasing the oxygen-to-metal ratio of the fuel. However, the extent to which this technique may be used is severely limited as a result of increased cladding attack with increased fuel oxygen-to-metal ratio. A second specification modification approach is to use large pellet-to-cladding gaps in the blanket columns to accommodate volume changes associated with cesium/blanket material reaction products. This approach is also limited in that as the blanket diameter decreases, the breeding efficiency of the reactor design also decreases.

The second major approach in controlling the fission product cesium is to use a getter material such as titanium oxide or niobium oxide at both the upper and lower ends of the fissile fuel column. This is the approach exemplified by U.S. Pat. No. 4,257,847 and to which reference should be had for additional information and detail with respect to the fuel elements and the problems with respect to cesium migration. In that approach, low density pellets of niobium oxide or titanium oxide are interposed between the fuel column and the upper and lower blanket columns to trap the fission product cesium. This approach carries a penalty in the breeding performance of the fuel in that, if sufficient getter material is used for cesium control, the blanket materials will be further displaced from the active core region and the neutron fluence reduced. Further, parasitic neutron reaction with the getter material and accumulated cesium will tend to reduce the neutron flux in the blanket region thereby reducing the breeding efficiency.

The aim of this invention is to provide a different arrangement which will control the migration of the fission product cesium without having a detrimental effect on fuel pin performance lifetime.

SUMMARY OF THE INVENTION

In accordance with the essence of the invention in its currently preferred embodiment, a cesium getter is located above the upper fertile blanket, the gettering material in one preferred embodiment being a stainless steel foil substrate coated with silicon carbide and then helically rolled and installed into the fuel pin space above the uppermost fertile blanket pellet. During operation, the cesium will migrate to and be collected and isolated on the silicon carbide material.

DRAWING DESCRIPTION

DESCRIPTION OF THE PREFERRED EMBODIMENTS

Figure 1:
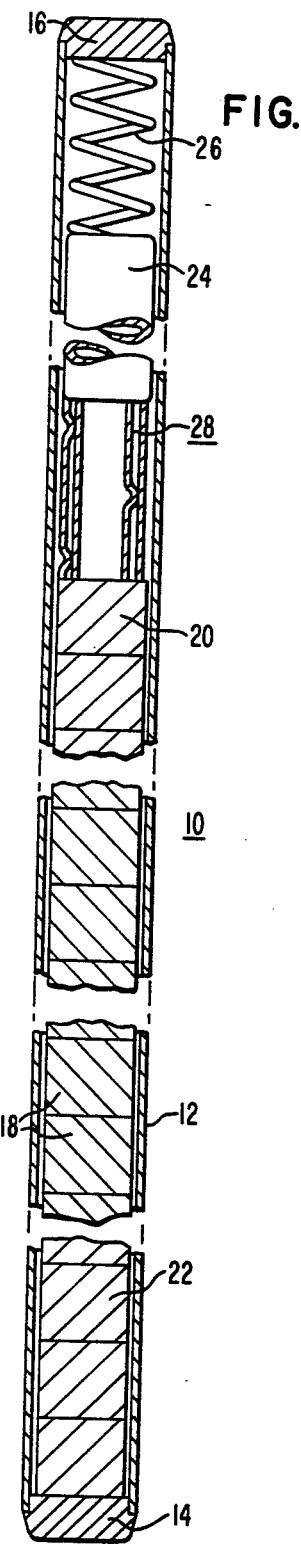
FIG. 1 is a broken, longitudinal cross-section of one embodiment of the fuel pin of the invention.

One form of fuel pin 10 illustrated in FIG. 1 includes a tubular cladding 12 sealed at both ends by end plugs 14 and 16 and is provided with a stacked arrangement of fissile fuel pellets 18 more or less centered in the height of the pin and sandwiched between a series of fertile material pellets 20 forming the upper blanket and a series of fertile pellets 22 forming the lower blanket. A plenum tube 24 near the upper end of the pin provides a void space to collect released fission product gases and a plenum compression spring 26 is located between the end cap 16 and the plenum tube 24.

Figure 2:
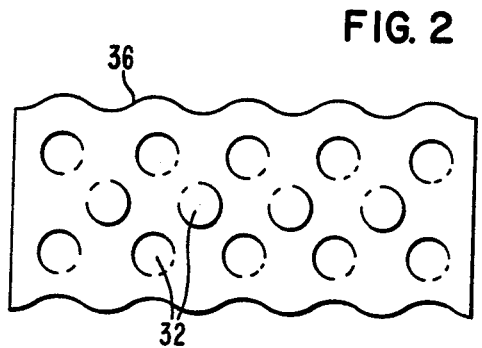
FIG. 2 is a face view of a foil substrate in planar form before being rolled to form one type of getter element.
Figure 3:
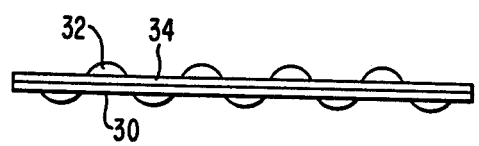
FIG. 3 is the edge view of the planar form of FIG. 2.
Figure 4:
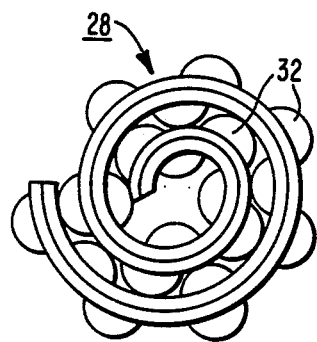
FIG. 4 is an end view of a getter element in helical form obtained by rolling the planar element of FIGS. 2 and 3.

In the embodiment shown in FIG. 1, the getter element generally designated 28 is located at the upper end of the upper blanket 20 and is interposed between that blanket and the plenum tube 24. This particular form of getter element is made in a way which is best understood in connection with FIGS. 2-4. A foil substrate 30 of a material such as stainless steel is provided with spacer elements such as dimples 32 on one or both surfaces of the foil and is then provided on at least one surface with a silicon carbide coating 34. The planar foil is then rolled into a helix as shown in FIG. 4. It will be noted that the longitudinal edges of the planar form of the foil are preferably provided with scallops 36 so that in the rolled form, both ends of the helix will be scalloped to promote gas passage.

Figure 5:
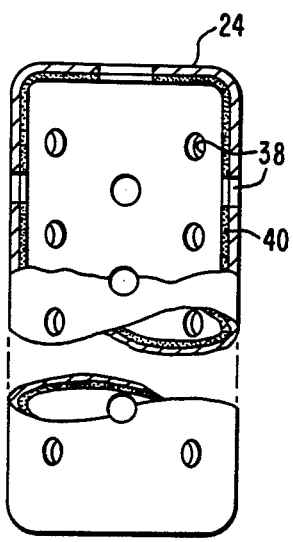
FIG. 5 is a longitudinal sectional view of a plenum tube.
Figure 6:
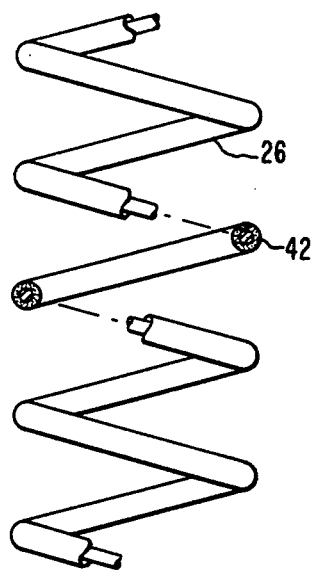
FIG. 6 is a longitudinal sectional view of a plenum spring.

In another form of the invention, the plenum tube 24 (FIG. 5) is provided with gas flow holes 38 and at least the inner surface of the plenum tube has a silicon carbide coating 40 applied thereto. Alternatively, or in conjunction with the coated plenum tube, the plenum spring 26 (FIG. 6) is provided with a silicon carbide coating 42 on the coils thereof. Either or both of the embodiments of FIGS. 5 and 6 may also be used in conjunction with a separate getter 28.

Figure 7:
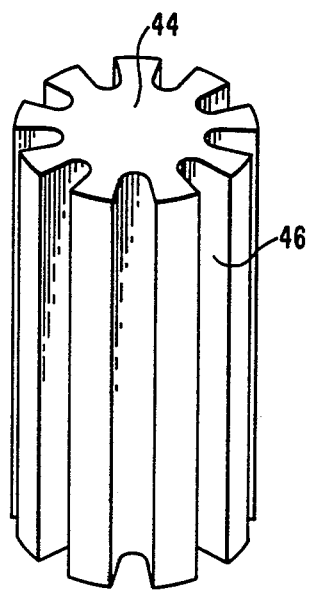
FIGS. 7 and 8 are alternative forms which a silicon carbide pellet can take for purposes of functioning as a cesium getter.
Figure 8:
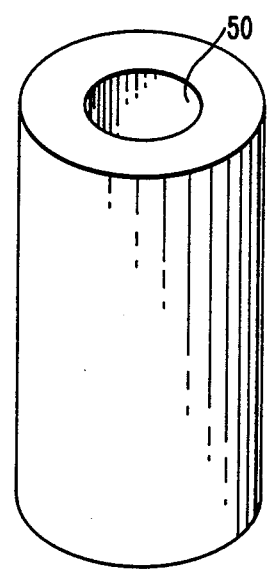

In FIG. 7, an alternate getter takes the form of a silicon carbide pellet 44 which is longitudinally slotted at spaced locations around its circumference to provide for an extended surface area. In FIG. 8, the silicon carbide pellet 48 is provided with a longitudinal bore 50 to provide for the extended surface area.

In operation, the getter, in whatever form, provides a means of collecting and isolating the fission produce cesium, thereby improving the fuel pin lifetime by preventing reaction between cesium and the mixed oxide fuel and blanket materials.

Irradiation tests with silicon carbide pellets has shown this material to be an excellent cesium getter and this material has demonstrated the capability of drawing cesium adequately beyond the top of the fuel column to prevent reaction with both fuel and fertile blanket materials. A volume expansion occurs in the silicon carbide getter material as cesium is absorbed, and to accommodate this volume change, a low density getter material which provides a large surface area is preferred. The forms of getters shown in the drawing are considered to meet the requirements of low density, large surface area.

Finally, the benefits to be derived from the subject invention include (1) control and isolation of fission product cesium, (2) improved reactor safety by mitigation of fission product release if a severe accident were to occur, (3) increased neutron economy by isolation of fission product cesium outside the active core and blanket regions, thereby reducing parasitic neutron reactions, (4) simplified recovery of much of the fission product cesium during reprocessing, and (5) improved fuel pin lifetime by prevention of cesium fuel and cesium blanket interactions.

We claim:

1. A breeder reactor fuel element including a tubular cladding hermetically sealed at each end by an end plug, one interior portion of the cladding defining a fuel space filled with a column of fissile material comprising a mixture of $PO_2$ and $UO_2$, and an upper and lower fertile material blanket comprising $UO_2$ arranged axially in tandem with the fissile column within the cladding, wherein the improvement comprises a cesium getter disposed at least at the upper end of said upper blanket, said getter including a helical rolled substrate of stainless steel coated with silicon carbide material for collecting and isolating cesium migrating thereto and said stainless steel substrate having dimples formed therein for holding apart successive convolutions of said rolled substrate to permit a volume expansion of said getter.

2. The element of claim 1, wherein said cesium getter further includes a plenum tube having at least one surface thereof coated with silicon carbide and a helical spring coated with silicon carbide, the spring being disposed in the upper end of the tubular cladding.

* * * * *